(12) United States Patent
Ragona et al.

(10) Patent No.: US 11,569,744 B2
(45) Date of Patent: Jan. 31, 2023

(54) DIRECT CURRENT (DC)-DC POWER CONVERTER WITH MULTIPLE MODES OF OPERATION

(71) Applicant: Texas Instruments Incorporated, Dallas, TX (US)

(72) Inventors: Scott Edward Ragona, Bethlehem, PA (US); Rengang Chen, Center Valley, PA (US); Preetam Charan Anand Tadeparthy, Bangalore (IN); Evan Michael Reutzel, Center Valley, PA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 10 days.

(21) Appl. No.: 17/152,223

(22) Filed: Jan. 19, 2021

(65) Prior Publication Data

US 2022/0231605 A1 Jul. 21, 2022

(51) Int. Cl.
*H02M 3/158* (2006.01)
*H02M 1/08* (2006.01)
*H02M 1/00* (2006.01)

(52) U.S. Cl.
CPC ......... *H02M 3/158* (2013.01); *H02M 1/0032* (2021.05); *H02M 1/08* (2013.01); *H02M 3/1584* (2013.01)

(58) Field of Classification Search
CPC .... H02M 3/156; H02M 3/1566; H02M 3/158; H02M 3/1584; H02M 1/0032; H02M 1/08
See application file for complete search history.

(56) References Cited

U.S. PATENT DOCUMENTS

| | | | |
|---|---|---|---|
| 8,917,074 B2 | 12/2014 | Luo et al. | |
| 9,997,992 B1 | 6/2018 | Wu et al. | |
| 10,897,247 B2* | 1/2021 | Marques Martins | H03K 17/28 |
| 2013/0271101 A1* | 10/2013 | Nanov | H02M 1/32 |
| | | | 327/365 |
| 2018/0294720 A1 | 10/2018 | Zhu et al. | |
| 2020/0366207 A1 | 11/2020 | Luo | |
| 2022/0004248 A1* | 1/2022 | Chen | H02M 3/158 |

OTHER PUBLICATIONS

International Search Report dated May 5, 2022, PCT Application No. PCT/US2022/012870, 3 pages.
Written Opinion dated May 5, 2022, PCT Application No. PCT/US2022/012870, 5 pages.

* cited by examiner

*Primary Examiner* — Alex Torres-Rivera
(74) *Attorney, Agent, or Firm* — Ray A. King; Frank D. Cimino (57) ABSTRACT

A converter stage having a control pin, an input voltage pin, an output pin, a ground pin, a high-side switch coupled between the input voltage pin and the output pin, a low-side switch coupled between the output pin and the ground pin, a current sensor configured to detect a current at the output pin, and control logic coupled to the control pin and the current sensor. The control logic is configured to control switching of the high-side and the low-side switches in continuous conduction mode, discontinuous conduction mode, and body braking control for the converter stage in response to a first signal received via the control line and a second signal received from the current sensor. A driver controls switching, based on the detected current and sequential event tracking, between an on state and an off state.

19 Claims, 8 Drawing Sheets

DIRECT CURRENT (DC)-DC POWER CONVERTER WITH MULTIPLE MODES OF OPERATION

FIELD

The present disclosure primarily relates to analog circuits, and is related in particular to direct current (DC)-DC power converters.

SUMMARY

In accordance with aspects described in this specification, a buck converter stage includes an input communication line connected to a control pin, a high-side transistor switch coupled between an input voltage line and an output of the buck converter stage, and a low-side transistor switch coupled between the output of the buck converter stage and a ground voltage. A current sensor detects a current through the output of the buck converter stage, and control logic communicably coupled to the input communication line and the current sensor controls switching of the high-side transistor switch and of the low-side transistor switch in a continuous conduction mode, a discontinuous conduction mode, and body braking control for the buck converter stage. The control logic performs control in response to signals received on the input communication line and signals received from the current sensor.

The buck converter stage may include one or more of the following features. An inductor is coupled to the output of the buck converter stage, and the current through the output of the buck converter corresponds to the current through the inductor. The high-side transistor switch includes a field effect transistor and the low-side transistor switch includes a field effect transistor. The high-side transistor switch includes a metal-oxide semiconductor transistor and the low-side transistor switch includes a metal-oxide semiconductor transistor. The control logic further controls switching of the high-side transistor switch and the low-side transistor switch in response to pulse width modulation signals received via the input communication line. The control logic further controls switching between continuous conduction mode, discontinuous conduction mode, and body braking control for the buck converter stage in response to a first, second, or third signal level received on the input communication line in combination with signals received from the current sensor. The control logic switches from continuous conduction mode to body braking control in response to receiving the third signal level on the input communication line and switches from body braking control to discontinuous conduction mode in response to detecting a crossing of the current through the output of the buck converter stage past a predetermined threshold level while receiving the third signal level on the input communication line. The buck converter stage is included in an apparatus having a plurality of direct current-to-direct current (DC-DC) converter stages. Each of the plurality of DC-DC converter stages includes a corresponding input communication line to independently control switching between continuous conduction mode, discontinuous conduction mode, and body braking control for the respective DC-DC converter stage.

In another aspect of the features described in this specification, a buck converter stage has an output, and a driver for the buck converter stage receives a control signal on a shared input communication line and controls switching of the buck converter stage between an on state and an off state. The output of the buck converter stage is connected to an input voltage in the on state and to a ground voltage in the off state. The driver detects a current through the output of the buck converter stage and controls switching between a plurality of modes, including a continuous conduction mode, a discontinuous conduction mode, and a body braking mode for the buck converter stage in response to the control signal received on the shared input communication line based on the detected current through the output of the buck converter stage and sequential event tracking.

The buck converter stage may include one or more of the following features. The control signal includes a pulse width modulation signal having a value selected from first, second, and third values, and the buck converter stage switches to the on state in response to the control signal having the first value, to the off state in response to the control signal having the second value, and from the continuous conduction mode to the body braking mode in response to the control signal having the third value. The third value comprises a tri-state value between the first and second values. The control signal comprises a pulse width modulation signal having a value selected from first, second, and third values, with the buck converter stage adapted to switch to the on state in response to the control signal having the first value, to the off state in response to the control signal having the second value, and from the body braking mode to the discontinuous conduction mode in response to the current through the output passing a threshold current value while the control signal has the third value. The buck converter stage includes a high-side transistor switch coupled between the input voltage line and an output of the buck converter stage and a low-side transistor switch coupled between the output of the buck converter stage and the ground voltage.

In another aspect of the features described in this specification, an electronic device has a multi-stage buck converter including a plurality of buck converter stages as described above.

DETAILED DESCRIPTION

Power conversion techniques continue to be the focus in the power management industry. With the proliferation of portable electronic devices and increasing emphasis on power efficiency, switch mode power supplies and power management integrated circuits are used extensively in mobile phones, notebook computers, laptop computers, desktop computers, televisions, automotive applications, etc. A direct current (DC)-DC converter includes one or more switches that are selectively actuated to provide a controlled DC output voltage or current based on a received DC voltage. A DC-DC converter may step down (buck) or step up (boost) the input DC voltage. Buck converters may be used in power supplies of portable electronic equipment such as mobile phones, notebook computers, and other devices to convert the output power from the battery to a lower voltage level usable by the circuitry of the electronic devices. A buck converter may include a controller, a driver, a pair of power switches (high-side and low-side), and an LC filter coupled to the switches. The controller provides a control signal to the driver, which alternately drives the high-side and low-side power switches, turning them on and off. If the PWM signal is high, the high-side power switch is ON and the low-side power switch is OFF. The switches thus control the inductor current and the output voltage of the converter. Such controllers may use a pulse width modulated (PWM) signal to control the state of the high and low-side power switches.

Due to the ever-present push to reduce integrated circuitry form factor, it is desirable to reduce the number of pins for a multi-phase DC-DC converter circuit design, so that only one control signal is used between the controller and each power converter stage. It is advantageous to use only one communication line for pulse width modulation (PWM), discontinuous mode (DCM), and body braking control for each stage of the DC-DC converter. A multi-phase DC-DC converter offers several advantages over a single power converter stage including lower current ripple on the input and output capacitors, faster transient response to load steps, improved power handling capabilities, and higher system efficiency.

Figure 1:
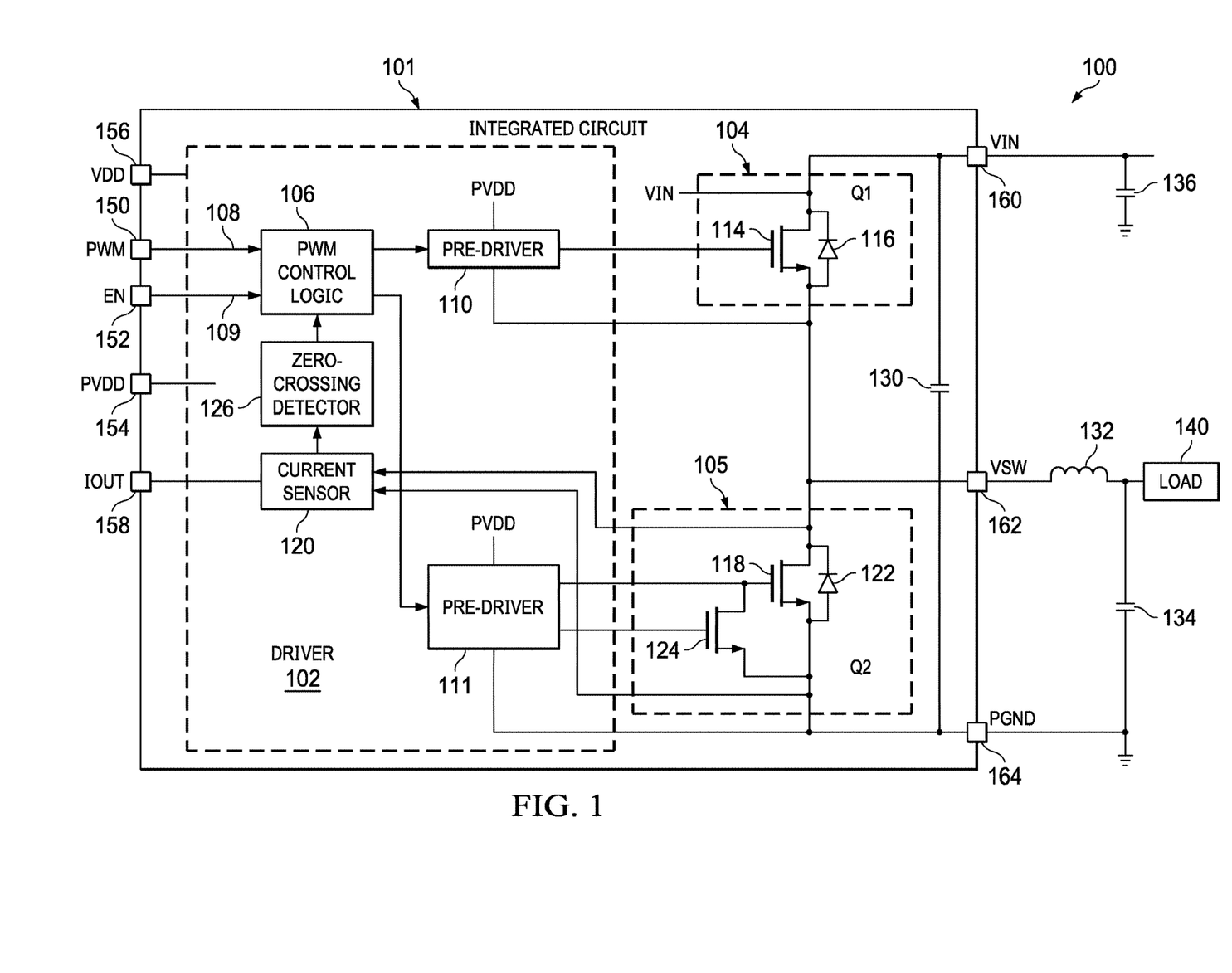
FIG. 1 is a circuit diagram of an embodiment of a single-pin pulse width modulation (PWM) control DC-DC power converter integrated circuit according to one or more aspects of the present disclosure.

FIG. 1 is a circuit diagram of an embodiment of a single power converter stage 100 of a DC-DC power converter integrated circuit 101 with a single-pin pulse width modulation (PWM) control line 108 according to one or more aspects of the present disclosure. The power converter stage 100 may be a buck converter stage that is controlled by the PWM control line 108, which may be connected to a control pin of the buck converter stage and/or a control pin of a multi-phase controller. The power converter stage 100 includes a driver circuit 102 coupled to two power switches Q1 104 and Q2 105. The driver circuit 102 includes a PWM control logic circuit 106 that receives a PWM input 108 from a PWM pin 150 and an enable (EN) input 109 from an enable pin 152. Two independent control PWM outputs from PWM control logic 106 are coupled to the input of first and second pre-drivers 110 and 111 to independently control the first and second pre-drivers 110 and 111, as further described below. The outputs of the first and second pre-drivers 110 and 111 are coupled, respectively, to the high-side power switch (Q1) 104 and low-side power switch (Q2) 105. The first and second pre-drivers 110 and 111 are further coupled to the positive power supply PVDD, which is coupled to a PVDD pin 154. A separate power supply pin 156 may also be used to power other parts of the circuit. The first and second pre-drivers 110 and 111 selectively and independently apply a power signal from the positive power supply PVDD to the high-side power switch (Q1) 104 and low-side power switch (Q2) 105 in response to output control signals from the PWM control logic 106. For example, power may be applied to either turn the high-side power switch (Q1) 104 on or to turn the low-side power switch (Q2) 105 on or both the high-side power switch (Q1) 104 and the low-side power switch (Q2) 105 may be turned off by removing power from the high-side power switch (Q1) 104 and the low-side power switch (Q2) 105.

In some implementations, the high-side power switch 104 includes an n-channel MOSFET 114, whose gate terminal is coupled to the output of the pre-driver 110, whose drain terminal is coupled to the input voltage VIN, and whose source terminal is coupled to the first pre-driver 110. The first pre-driver 110 may turn on the high-side power switch 104 by applying, e.g., a positive voltage to the gate terminal of the n-channel MOSFET 114 relative to the voltage level of the source terminal of the n-channel MOSFET 114. The first pre-driver 110 may turn off the high-side power switch 104 by applying the same or a similar voltage level to both the gate terminal and the source terminal of the n-channel MOSFET 114. A diode 116 is coupled between the drain and source terminals of the MOSFET 114. The low-side power switch 105 includes an n-channel MOSFET 118, whose gate terminal is coupled to an output of the second pre-driver 111, whose drain terminal is coupled to a current sensor 120, and whose source terminal is coupled to a ground (PGND) pin 164. The second pre-driver 111 may turn on the low-side power switch 105 by applying, e.g., a positive voltage to the gate terminal of the n-channel MOSFET 118 relative to the voltage level of the source terminal of the n-channel MOSFET 118. The second pre-driver 111 may turn off the low-side power switch 105 by applying the same or a similar voltage level to both the gate terminal and the source terminal of the n-channel MOSFET 118. The output of the current sensor 120 is coupled to a pinout 158 as an output current, IOUT. A diode 122 is further coupled between the drain and source terminals of the MOSFET 118. The low-side power switch 105 includes a second n-channel MOSFET 124, whose gate terminal is also coupled to an output of the second pre-driver 111, whose drain terminal is coupled to the gate terminal of the first n-channel MOSFET 114, and whose source terminal is coupled to ground and to a second input to the current sensor 120. An input of a zero-crossing detector 126 is coupled to an output of the current sensor 120 and an output of the zero-crossing detector 126 output is coupled to the PWM control logic circuit 106. A capacitor 130 is coupled between the drain of MOSFET 114 and the source terminals of MOSFETs 118 and 124. An inductor 132 and an output capacitor 134 are further coupled in series between a common switch voltage (VSW) node (or output pin 162) and ground. The common switch voltage node is coupled to the source of MOSFET 114 and the drain terminal of MOSFET 118. Another output capacitor 136 is coupled between an input voltage pin 160, VIN, and ground pin 164. In some implementations, ground may be a different reference voltage. Other types of transistor switches may also be used, which may use other configurations of applying power to turn the switches on and off.

The power converter stage 100 operates by controllably switching the high-side and low-side power switches Q1 and Q2 alternately on and off, so the output inductor 132 is alternately connected between the DC input voltage (VIN) and ground. This produces an alternately ramped-up and ramped-down output current through the output inductor 132 to the output node, and causes a stepped-down DC output voltage to be delivered to a load 140. Switching the high-side and low-side power switches Q1 and Q2 results in the power converter stage 100 being in an on state when the high-side power switch Q1 is on and the low-side power switch Q2 is off and being in an off state when the high-side power switch Q1 is off and the low-side power switch Q2 is on.

The DC-DC converter 100 operates primarily in two distinct modes with respect to the inductor current, the continuous conduction mode (CCM) and discontinuous conduction mode (DCM). In CCM, the PWM waveform controls the on/off switching of the high and low-side power switches Q1 104 and Q2 105 such that the power switches may be mutually complementary, so that a conductive path from one or the other of the input voltage source and ground will be continuously provided through one or the other power switch 104 or 105 to the output inductor 132 and the inductor current is always flowing. When very low current demands from the load cause the average inductor current to decrease below a threshold level at which CCM is able to provide efficient operation, such as when the electronic device is in power-saving mode to prolong battery life, the DC-DC converter operates in DCM, and the inductor current falls to zero for a portion of the switching cycle. The DC-DC converter may also operate in the body braking (BB) mode in transient load conditions. Body braking is a technique used to suppress overshoot voltage at the output by using the body diode of the power MOSFETs to dissipate the excess current at the output.

The current sensor 120 may detect a current through the output of the power converter stage 100. In some implementations, the current sensor 120 may detect at least a crossing of the current past a predetermined threshold level. The PWM control logic 106 may communicate with the PWM control line 108 and the current sensor 120. In response to signals received on the PWM control line 108 and from the current sensor 120, the PWM control logic 106 may control switching of the high-side and low-side power switches 104 and 105 in continuous conduction mode, discontinuous conduction mode, and body braking control for the power converter stage 100.

The PWM signals received on the PWM control line 108 may include high, low, and tri-state values, where the tri-state value is an intermediate value between the high and low values. In alternative implementations, the tri-state value may be a PWM signal value higher than the high value or lower that the low value. In other alternatives, the switching of the high-side switch 104 and the low-side switch 105 in continuous conduction mode, discontinuous conduction mode, and body braking control may be responsive to other types of signal values (e.g., a predetermined pattern of PWM values) or responsive to tracking of other sequential events. Thus, control of switching between continuous conduction mode, discontinuous conduction mode, and body braking control may use a single, shared communication line or pin (i.e., shared for the particular power converter stage 100), rather than, for example, having a communication line or pin for controlling discontinuous conduction mode that is separate from a communication line or pin for PWM control and body braking control. For example, the power converter stage 100 may switch to an on state in response to the PWM control signal having a high value, to the off state in response to the control signal having a low value, and from the continuous conduction mode to the body braking mode in response to the control signal having the tri-state value.

Switching between continuous conduction mode, discontinuous conduction mode, and body braking control may be controlled in response to the PWM signals in combination with signals received from the current sensor, which may be a zero crossing detector or sensor for detecting a crossing of a predetermined threshold current value. For example, the PWM control logic 106 may switch from continuous conduction mode to body braking control in response to receiving a tri-state value on the PWM control line 108 and may switch from body braking control to discontinuous conduction mode in response to receiving a signal (e.g., directly from the current sensor 120 or via the zero-crossing detector 126), indicating a crossing of the current through the output of the power converter stage 100 past a predetermined threshold level while receiving the tri-state signal level on the input communication line.

Figure 2A:
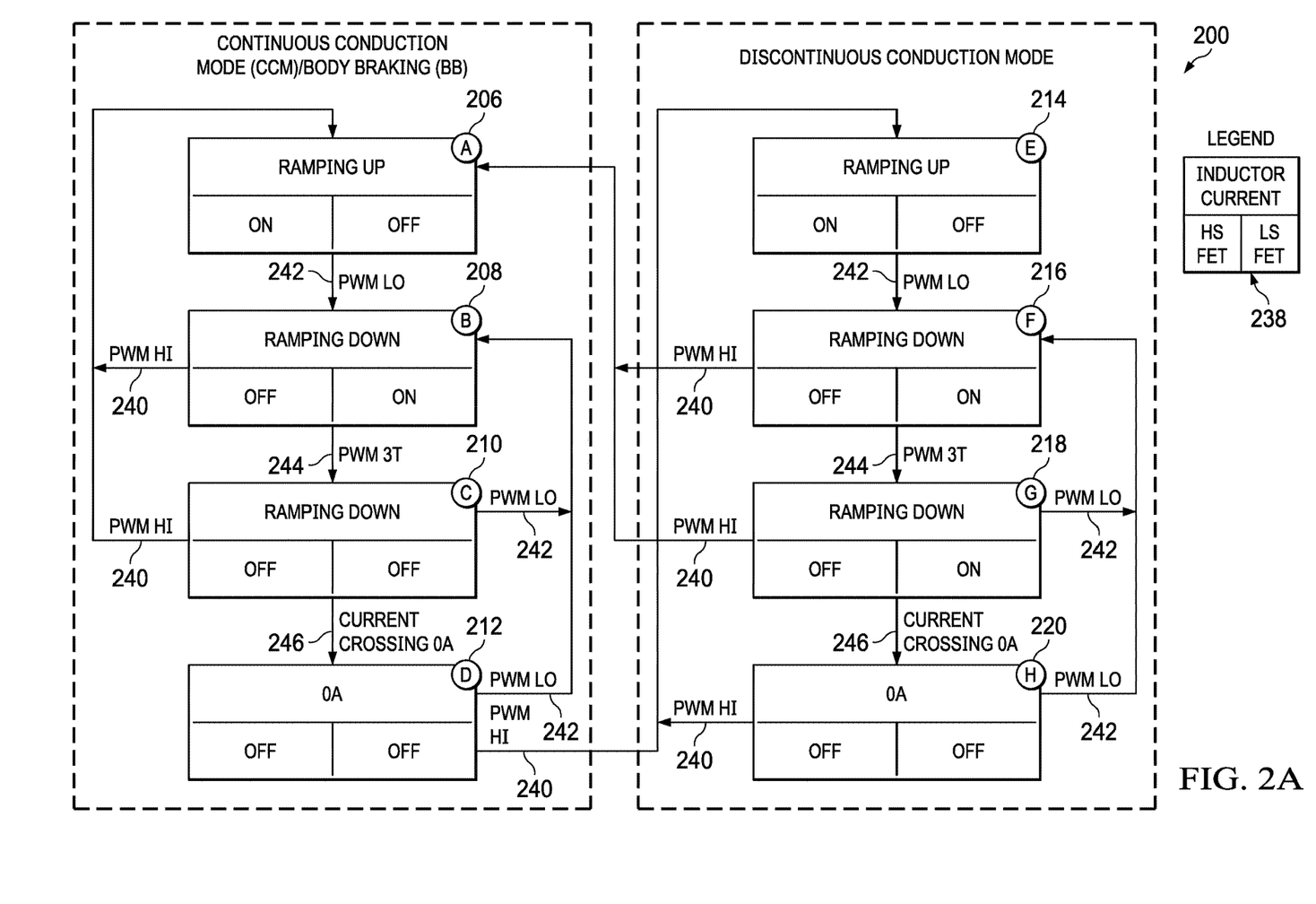
FIG. 2A illustrates a state transition diagram for a single-pin pulse width modulation (PWM) control DC-DC power converter according to one or more aspects of the present disclosure.

FIG. 2A illustrates a state transition diagram 200 for a single-pin pulse width modulation (PWM) control DC-DC power converter, such as the PWM control DC-DC power converter 100 of FIG. 1, according to one or more aspects of the present disclosure. Each state 206-220 in the diagram 200 has an associated inductor current 222-236 (ramping up, ramping down or 0 amps) and the high-side power switch Q1 104 and low-side power switch Q2 105 are each either on or off, corresponding to the positions shown in the legend 238 in FIG. 2A. In most situations, when the high-side power switch Q1 104 is on, the low-side power switch Q2 105 is off and vice versa. There are some situations in which both switches are turned off. The PWM control signal is received from a controller external to the power converter stage 100, which may control the level of PWM control signals (e.g., by applying the PWM control signal) for multiple different power converter stages 100 in a multi-stage power converter. The various states 206-220 of the state transition diagram 200 are controlled by a combination of a pulse width modulation control signal (e.g., received on PWM control line 108 of FIG. 1) and an inductor current level (e.g., as detected by the current sensor 120 of FIG. 1). The levels of the PWM control signal do not have a one-to-one correspondence to modes of operation. Rather, each level of the PWM control signal may correspond to more than one mode of operation (e.g., CCM, DCM, or body braking) depending on the current state 206-220 and the inductor current level.

Figure 2B:
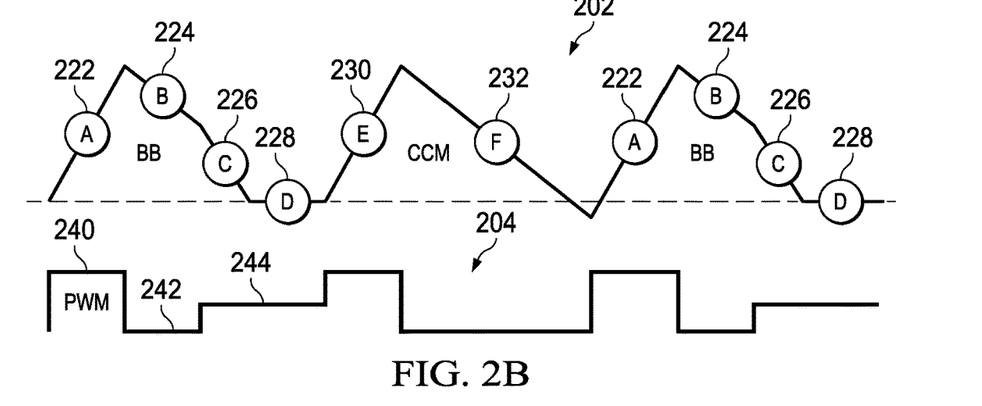
FIGS. 2B and 2C depict a graph of an illustrative inductor current waveform and a graph of a pulse width modulation control signal corresponding to each of the states shown in FIG. 2A.
Figure 2C:
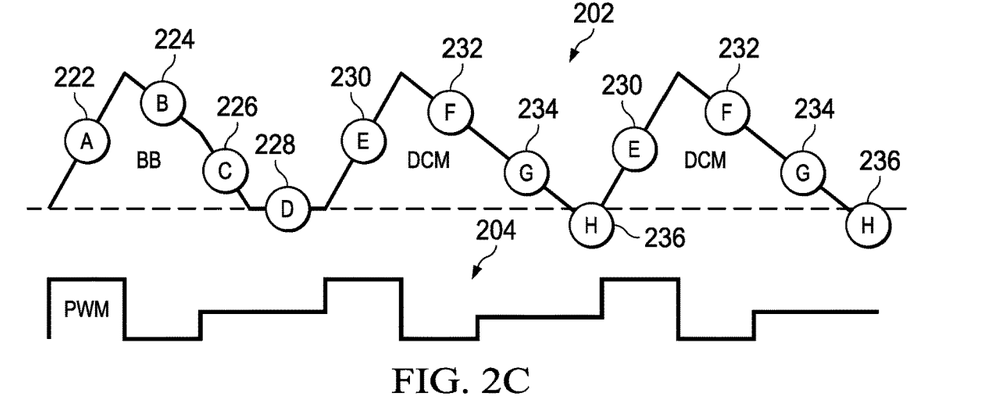

FIGS. 2B and 2C depict a graph 202 of an illustrative inductor current waveform and a graph 204 of a pulse width modulation control signal corresponding to each of the states 206-220 shown in FIG. 2A. In the illustrated graphs 202 and 204, the x-axis represents time, and the y-axis represents inductor current level in the inductor current waveform graph 202 and PWM voltage level in the pulse width modulation control signal graph 204. Letters A-H indicate a correspondence between inductor current levels 222-236 in FIGS. 2B and 2C and states 206-220 in the state transition diagram 200. As illustrated in FIGS. 2B and 2C, the inductor current ramping up at 222 corresponds (as indicated by the letter A) to a first CCM state 206. The inductor current ramping down at 224 corresponds (as indicated by the letter B) to a second CCM state 208. The inductor current ramping down at 226 corresponds (as indicated by the letter C) to a first BB state 210. The inductor current at 0 amps at 228 corresponds (as indicated by the letter D) to a second BB state 212. The inductor current ramping up at 230 corresponds (as indicated by the letter E) to a first DCM state 214. The inductor current ramping down at 232 corresponds (as indicated by the letter F) to a second DCM state 216. The inductor current ramping down at 234 corresponds (as indicated by the letter G) to a third DCM state 218. The inductor current at 0 amps or below at 236 corresponds (as indicated by the letter H) to a fourth DCM state 220.

Also in FIGS. 2B and 2C, the graph 204 of the pulse width modulation control signal shows the level of the pulse width modulation control signal corresponding to states 206-220 in the state transition diagram 200. As discussed above, the pulse width modulation control signal level (as shown in the PWM control signal graph 204) controls the switching of the high-side power switch Q1 104 and low-side power switch Q2 105, which in turn impacts the inductor current (as shown in the inductor current waveform graph 202). The power converter stage 100 may operate in CCM, represented by states 206 and 208, where the PWM alternates between high (PWM HI) 240 and low (PWM LO) 242 states, and the high- and low-side power switches Q1 and Q2 104 and 105 switch on and off alternately to deliver a current ramping up and down to provide a DC voltage level to the load 140. In the first CCM state 206, PWM is high (as indicated at 240), the power switches Q1 and Q2 104 and 105 are on and off, respectively, which causes the inductor current to be ramping up at 222. When the PWM switches to a low value at 242, the power converter stage 100 transitions to the second CCM state 208, where the power switches Q1 and Q2 104 and 105 are turned off and on, respectively, so that the inductor current ramps down as indicated at 224 at a rate determined by the output voltage and inductor value. While in the second CCM state 208, if the PWM control signal is switched back to a high value 240, e.g., under control of an external controller, the power converter stage transitions back to the first CCM state 206, meaning that the power switches Q1 and Q2 104 and 105 are turned on and off, respectively, so that the inductor current ramps up as indicated at 222. The power converter stage may remain in CCM under operating conditions where the load is drawing operating current.

While in the second CCM state 208, if a transient load condition is detected, the PWM control signal (e.g., under control of an external controller) is changed to a tri-state signal (PWM 3T) as indicated at 244, which causes a transition to the first BB state 210, where the power converter stage operates in body braking (BB) mode. In body braking mode, both power switches Q1 and Q2 204 and 206 are turned off, which causes the inductor current to continue to ramp down as indicated at 226, but at a sharper rate due to the larger voltage drop across the body diode 122 across power switch Q2 206. This higher voltage drop helps discharge the inductor current faster, which reduces the output voltage overshoot.

While in the first BB state 210, if the PWM signal is changed to a low value as indicated at 242, the power converter stage 100 returns to the second CCM state 208, which means that the low-side power switch Q2 105 is turned on and the inductor current continues to ramp down (as indicated at 224) at a rate dictated by the output voltage and inductor value. If the PWM signal is changed to a high value 240, the power converter stage 100 returns to the first CCM state 206, which means that the high-side power switch Q1 104 is turned on and the inductor current ramps up (as indicated at 222). If, on the other hand, the zero-crossing detector 126 detects that the inductor current reaches zero 246 (e.g., within a predetermined threshold range of true zero) (shown in FIG. 2A as "Current crossing 0A"), or some other threshold value, both the high- and low-side power switches Q1 and Q2 104 and 105 remain turned off and the power converter stage 100 transitions to the second BB state 212, where the inductor current remains at zero amps (as indicated at 228). While in the second BB state 212, if the PWM signal is changed to a low value 242, the power converter stage 100 transitions back to the second CCM state 208 and exits body braking mode. The continuous conduction mode and body braking are controlled by the controller for the multi-stage power converter using the PWM control signal.

If, while in the second BB state 212, the PWM signal is changed to a high value 240, the power converter stage 100 transitions to the first DCM state 214, which means that the power converter stage exits body braking mode and enters discontinuous conduction mode (DCM). The discontinuous conduction mode is controlled autonomously by the power converter stage 100, rather than by the controller for the multi-stage power converter. In the first DCM state 214, the power switch Q1 104 is turned on and power switch Q2 105 remains off, so that the inductor current ramps up, as shown at 230. If the PWM signal level changes to a low value 242, the power converter stage 100 enters the second DCM state 216, and the power switch Q1 104 is turned off and power switch Q2 105 is turned on, so that the inductor current ramps down, as indicated at 232.

The first DCM state 214 is equivalent to the first CCM state 206 (i.e., PWM is high 240, the power switches Q1 104 and Q2 105 are on and off, respectively, which causes the inductor current to be ramping up 222 or 230) and the second DCM state 216 is equivalent to the second CCM state 208 (i.e., PWM is low 242, the power switches Q1 104 and Q2 105 are off and on, respectively, which causes the inductor current to ramp down 224 or 232 at a rate determined by the output voltage and inductor value). One difference, in some implementations, is that in the first and second DCM states 214 and 216, the power converter stage 100 cannot directly enter body braking, at least not without at least briefly returning to the first CCM state 206 (resulting in at least a brief ramping up 222) and transitioning through the second CCM state 208 because a state transition to the first BB state 210 may only be performed from the second CCM state 208. This restriction helps enable control of both body braking and discontinuous conduction mode without having separate pin inputs to control each. Conversely, in the first and second CCM states 206 and 208, the power converter stage 100 effectively cannot enter discontinuous conduction mode until one cycle of body-braking is completed by transitioning through the first and second BB states 210 and 212 because a state transition to the first DCM state 214 may only be performed from the second BB state 212.

While the power converter stage 100 is in the second DCM state 216, if the PWM signal changes to a high value 240, the power converter stage 100 exits DCM and returns to the first CCM state 206 (i.e., continuous conduction mode). However, if in the second DCM state 216 the PWM is changed to a tri-state signal value 244, then the power switches Q1 104 and Q2 105 remain off and on, respectively, so that the inductor current continues to ramp down (as indicated at 234) at the same rate as in the second DCM state 216, respectively, and the power converter stage 100 transitions to the third DCM state 218, which enables the power converter stage to remain in discontinuous conduction mode. In the third DCM state 218, the power converter stage 100 loops back to the second DCM state 216 if the PWM signal changes to a low value 242, and if PWM changes to a high value 240 (while in either the second or third DCM state 216 or 218), the power converter stage 100 loops to the first CCM state 206. However, if an inductor current zero crossing 246 is detected while in the third DCM state 218, the power switch Q2 105 is turned off, the power converter state enters the fourth DCM state 220, and no current goes to the output. If the PWM signal changes to a low value 242 while in the fourth DCM state 220, then the power switch Q2 105 is turned on and the power converter stage 100 returns to the second DCM state 216. If, instead, while in the fourth DCM state 220, the PWM signal changes to a high value 240, then the power switch Q1 104 is turned on and the power converter stage 100 returns to the first DCM state 214.

Therefore, the power converter stage 100 operates in the first and second CCM states 206 and 208 in continuous conduction mode. Occasionally, the power converter stage enters the first BB state 210 (body braking) when the PWM has a tri-state value 244. Body braking may be activated for a transient load, and the power converter stage continues to the second BB state 212 if an inductor current zero-crossing 246 is detected. If a very light load is detected when the power converter stage 100 is in the second BB state 212, then the power converter stage 100 may be transitioned to the DCM states 214-220 and may stay in discontinuous conduction mode until a larger load is detected. When a larger load is detected, the power converter stage 100 may immediately begin continuous conduction, either by returning to the first CCM state 206 directly (from the second or third DCM states 216 or 218) or after a single cycle of the first and second DCM states 214 and 216.

If the power converter stage 100 is in the second CCM state 208 and a light load is detected, the power converter stage 100 goes through one body braking cycle, going through the first and second BB states 210 and 212, before the power converter stage 100 transitions to discontinuous conduction mode in the DCM states 214-220. When the load rises, the power converter stage then goes from the second or third DCM state 216 or 218 to the first CCM state 206 again, to return to operating in continuous conduction mode. Operating in body braking mode may occur for only one or two cycles in response to transient behavior.

FIGS. 3-9 are waveform diagrams of an embodiment of a single-pin pulse width modulation (PWM) control DC-DC power converter, such as the PWM control DC-DC power converter 100 of FIG. 1, according to one or more aspects of the present disclosure. In each figure, the top waveform depicts the inductor current level, while the bottom waveform depicts the PWM signal value. The discussion below refers to the states depicted in FIG. 2A.

Figure 3:
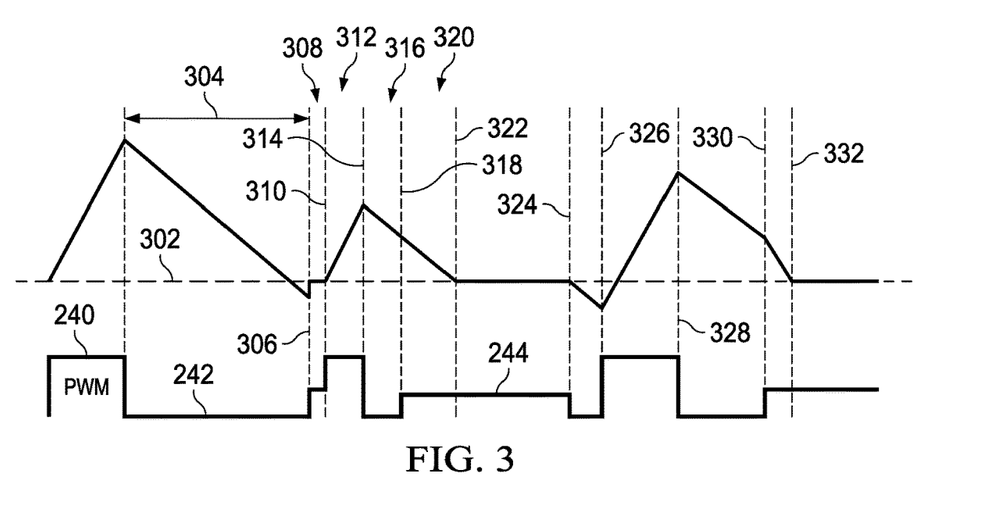
FIGS. 3-9 are waveform diagrams of an embodiment of a single-pin pulse width modulation (PWM) control DC-DC power converter according to one or more aspects of the present disclosure.

FIG. 3 depicts a situation in which body braking is initiated (by changing the PWM signal to a tri-state) after the inductor current crosses the "zero" threshold level 302. As discussed above, the threshold level used to trigger a detection of a zero crossing of the inductor current level may be zero amps or may be some threshold level very near zero amps (or it may be some other threshold level). Thus, the power converter stage transitions from the second CCM state 208 (during time frame 304) to the first BB state 210 in response to the PWM signal level switching from a low value 242 to the tri-state value 244 (at 306). From the first BB state 210, because the inductor current is already below the zero threshold level 302, the power converter stage immediately transitions to the second BB state 212 (during time frame 308). Then, when the PWM signal level changes to a high value 240 (at 310), the power converter stage transitions to the first DCM state 214 and the inductor current ramps up (during time frame 312). When the PWM signal level changes to a low value 242 (at 314), the power converter stage transitions to the second DCM state 216 and the inductor current ramps down (during time frame 316). Before the inductor current crosses the zero threshold 302, the PWM signal level changes to a tri-state value 244 (at 318). As a result, the power converter stage transitions to the third DCM state 218 and the inductor current continues to ramp down (during time frame 320), and when the inductor current crosses the zero threshold 302 (at 322), the power converter stage transitions to operation in the fourth DCM state 220 of discontinuous conduction mode until, in this example, the PWM signal level changes to a low value 242 (at 324), which causes the power converter stage to switch to the second DCM state 216. Thereafter, when the PWM signal level changes to a high value 240 (at 326), the power converter stage switches to the first CCM state 206, followed by the second CCM state 208 when the PWM signal level goes low (at 328), and then the first BB state 210 (body braking) when the PWM signal level changes to a tri-state value 244 (at 330). The power converter stage then effectively operates in a discontinuous conduction mode in the second BB state 212 when the inductor current reaches the zero threshold (at 332).

Figure 4:
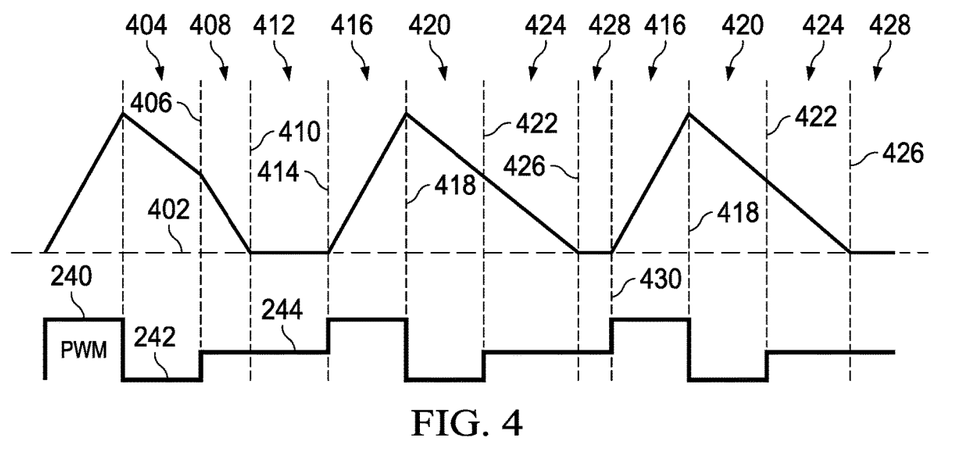

FIG. 4 depicts a situation in which body braking is initiated (by changing the PWM signal to a tri-state value 244) before the inductor current crosses the "zero" threshold level 402 followed by discontinuous conduction mode. Thus, the power converter stage transitions from the second CCM state 208 (during time frame 404) to the first BB state 210 (during time frame 408) in response to the PWM signal level switching from a low value 242 to the tri-state value 244 (at 406). When the inductor current reaches the zero threshold 402 while the PWM signal level remains at the tri-state value 244 (at 410), the power converter stage transitions to the second BB state 212. The power converter stage remains in the second BB state 212 during time frame 412 while the PWM signal level remains at the tri-state value 244. Thereafter, the power converter stage enters discontinuous conduction mode when the PWM signal level switches to a high value 240 at 414, which triggers a transition to the first DCM state 214 during time frame 416. In this example, the power converter stage remains in discontinuous conduction mode for the remainder of the graph. In the first DCM state 214, the inductor current ramps up during time frames 416. When the PWM signal level switches to a low value 242 at 418, the power converter stage transitions to the second DCM state 216 and the inductor current ramps down during time frames 420. When the PWM signal level switches to the tri-state value 244 at 422, the power converter stage transitions to the third DCM state 218 and the inductor current continues to ramp down during time frames 424. Then, when the inductor current reaches the zero threshold 402 (at time 426), the power converter stage transitions to the fourth DCM state 220 and the inductor current remains at zero amps during time frames 428. The power converter returns to the first DCM state 214 when the PWM signal level switches to a high value 240 at 430, and the process repeats.

Figure 5:
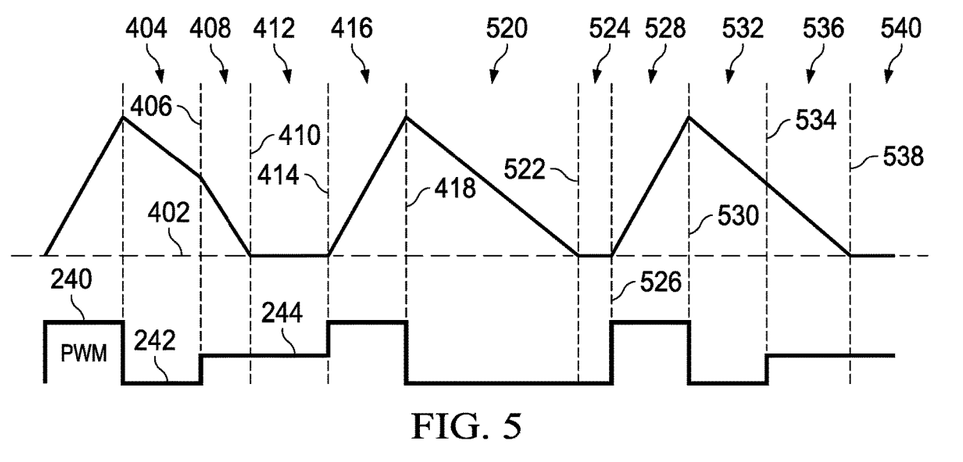

FIG. 5 depicts a situation in which continuous conduction mode is initiated after body braking. In this example, as in FIG. 4, body braking is initiated (by changing the PWM signal to a tri-state value 244) before the inductor current crosses the "zero" threshold level 402 and the power converter stage follows the same sequence of operation as in FIG. 4 through time frame 416. Thus, the power converter stage transitions from the second CCM state 208 (during time frame 404) to the first BB state 210 (during time frame 408) in response to the PWM signal level switching from a low value 242 to the tri-state value 244 (at 406). When the inductor current reaches the zero threshold 402 while the PWM signal level remains at the tri-state value 244 (at 410), the power converter stage transitions to the second BB state 212. The power converter stage remains in the second BB state 212 during time frame 412 while the PWM signal level remains at the tri-state value 244. Thereafter, the power converter stage enters discontinuous conduction mode when the PWM signal level switches to a high value 240 at 414, which triggers a transition to the first DCM state 214 during time frame 416. When the PWM signal level switches to a low value 242 at 418, the power converter stage transitions to the second DCM state 216 and the inductor current ramps down during time frame 520.

In this example, however, unlike in FIG. 4, the PWM signal level remains at a low value 242 until after the inductor current crosses the "zero" threshold level 402 at 522, the power converter stage remains in the second DCM state 216 during time frame 524, and does not transition to the third DCM state 218. As a result, when the PWM signal level changes to a high value 240 (at 526), the power converter stage transitions to the first CCM state 206 during time frame 528 to resume operating in a continuous conduction mode, from which it is possible to immediately transition again to body braking. Accordingly, when the PWM signal level changes to a low value 242 at 530, the power converter stage transitions to the second CCM state 208 during time frame 532. Then, when the PWM signal level changes to a tri-state value 244 at 534, the power converter stage transitions to the first BB state 210 (during time frame 536). When the inductor current reaches the zero threshold 402 while the PWM signal level remains at the tri-state value 244 (at 538), the power converter stage transitions to the second BB state 212 and remains in the second BB state 212 during time frame 540 while the PWM signal level remains at the tri-state value 244.

Figure 6:
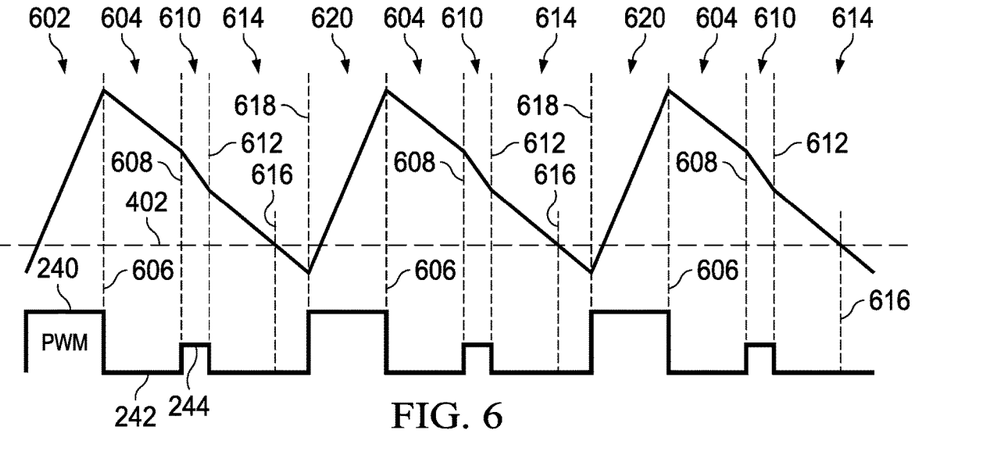
Figure 7:
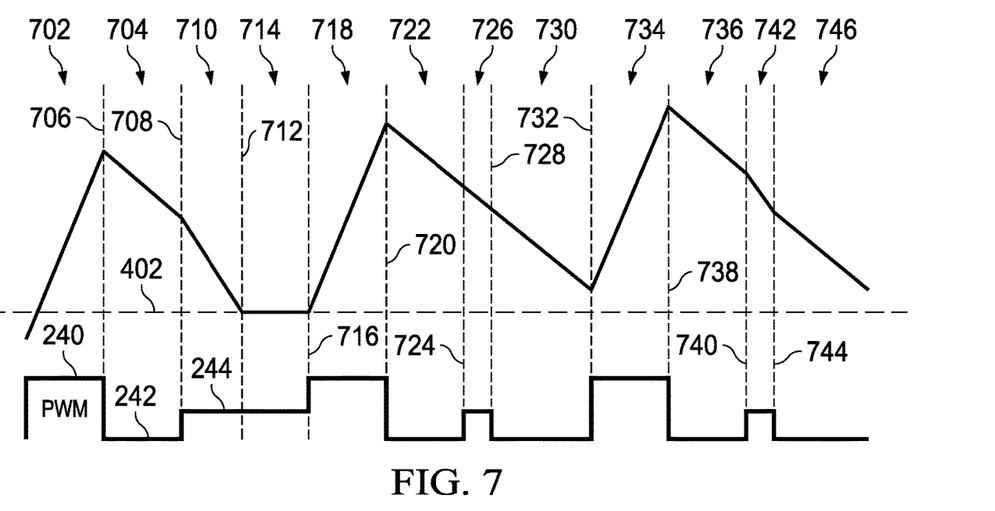

FIG. 6 depicts a situation in which body braking is initiated but the power converter stage remains in continuous conduction mode. Initially, the power converter stage is in the first CCM state 206 during time frame 602 while the PWM signal level is at the high level 240. The power converter stage transitions to the second CCM state 208 (during time frame 604) in response to the PWM signal level switching to a low level 242 at 606. Body braking is initiated when the PWM signal level changes from a low value 242 to a tri-state value 244 (at 608), where the power converter stage transitions to the first BB state 210 (during time frame 610). In this example, the PWM signal level returns to a low value 242 (at 612) before the inductor current reaches the zero threshold 402. As a result, the power converter stage transitions from the first BB state 210 back to the second CCM state 208 and remains in the second CCM state 208 during time frame 614. In this case, when the inductor current reaches the zero threshold 402 (at 616) while the PWM signal level remains at the low value 242, no change in state occurs because the state machine (e.g., as depicted in FIG. 2A) does not define a state transition resulting from a zero threshold crossing while in the second CCM state 208. Rather, the power converter stage remains in the second CCM state 208 until the PWM signal level switches to a high value 240 at 618, which causes the power converter stage to be in the first CCM state 206 during time frame 620. Thus, the power converter stage remains in continuous conduction mode and is capable of entering body braking in multiple consecutive cycles. As illustrated in this example, the process repeats through the same sequence of the first CCM state 206 during the time frames 620, the second CCM state 208 during the time frames 604, the first BB state 210 during the time frames 610, and back to the second CCM state 208 during time frames 614. FIG. 7 depicts a situation in which the power converter stage nominally enters discontinuous conduction mode but returns to continuous conduction mode before a full discontinuous conduction mode cycle, followed by body braking. Initially, the power converter stage is in the first CCM state 206 during time frame 702 while the PWM signal level is at the high level 240. The power converter stage transitions to the second CCM state 208 (during time frame 704) in response to the PWM signal level switching to a low level 242 at 706. Body braking is initiated when the PWM signal level changes from a low value 242 to a tri-state value 244 (at 708), where the power converter stage transitions to the first BB state 210 (during time frame 710). When the inductor current reaches the zero threshold 402 while the PWM signal level remains at the tri-state value 244 (at 712), the power converter stage transitions to the second BB state 212. The power converter stage remains in the second BB state 212 during time frame 714 while the PWM signal level remains at the tri-state value 244. Thereafter, the power converter stage enters discontinuous conduction mode when the PWM signal level switches to a high value 240 at 716, which triggers a transition to the first DCM state 214. In the first DCM state 214, the inductor current ramps up during the time frame 718. When the PWM signal level switches to a low value 242 at 720, the power converter stage transitions to the second DCM state 216 and the inductor current ramps down during time frame 722. When the PWM signal level switches to the tri-state value 244 at 724, the power converter stage transitions to the third DCM state 218 and the inductor current continues to ramp down during time frames 726. However, because the PWM signal level returns to a low value (at 728), which causes the power converter stage to transition from the third DCM state 218 back to the second DCM state 216. During time frame 730, the inductor current continues to ramp down. However, in this example, a zero threshold crossing does not occur before the PWM signal level changes to a high value 240 at 732, which causes the power converter stage to return to the first CCM state 206 and continuous conduction mode during the time frame 734, from which body braking is possible in the next cycle. Thus, in the illustrated example, the power converter stage transitions to the second CCM state 208 (during time frame 736) in response to the PWM signal level switching to a low level 242 at 738. Body braking is initiated when the PWM signal level changes from a low value 242 to a tri-state value 244 (at 740), where the power converter stage transitions to the first BB state 210 (during time frame 742). In this example, the PWM signal level returns to a low value 242 (at 744) before the inductor current reaches the zero threshold 402. As a result, the power converter stage transitions from the first BB state 210 back to the second CCM state 208 and remains in the second CCM state 208 during time frame 746.

Figure 8:
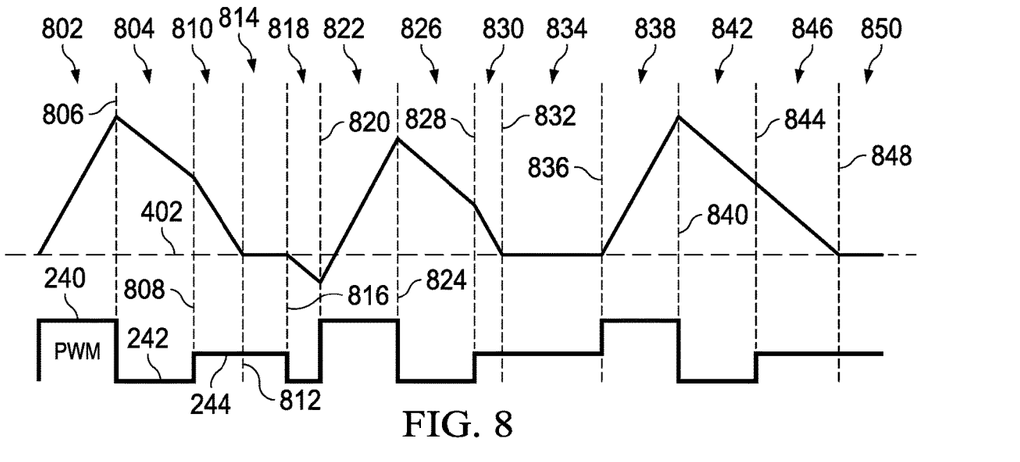

FIG. 8 depicts a situation in which the power converter stage performs body braking in two consecutive cycles. Initially, the power converter stage is in the first CCM state 206 during time frame 802 while the PWM signal level is at the high level 240. The power converter stage transitions to the second CCM state 208 during time frame 804 in response to the PWM signal level switching to a low level 242 at 806. Body braking is initiated when the PWM signal level changes from a low value 242 to a tri-state value 244 (at 808), where the power converter stage transitions to the first BB state 210 (during time frame 810). In this example, the power converter stage transitions to the second BB state 212 when the inductor current reaches the zero threshold 402 (at 812) while the PWM signal level has a tri-state value 244. The power converter stage remains in the second BB state 212 during time frame 814 while the PWM signal level remains at the tri-state value 244. Subsequently, the power converter stage transitions to the second CCM state 208 when the PWM signal level changes to a low value (at 816) while the power converter stage is still in the second BB state 212. As a result, the power converter stage remains in continuous conduction mode even after the inductor current crosses the zero threshold 402 while the PWM signal level has the tri-state value 244. As a result, body braking may be performed in the next cycle, as depicted in the waveform. In particular, the power converter stage remains in the second CCM state 208 during time frame 818 until the PWM signal level switches to a high value 240 at 820, which causes the power converter stage to be in the first CCM state 206 during time frame 822. When the PWM signal level switches to a low level 242 at 824, the power converter stage transitions to the second CCM state 208 during time frame 826. When the PWM signal level switches to the tri-state value 244 (at 828), the power converter stage transitions to the first BB state 210 and remains in the first BB state 210 during time frame 830. When the inductor current reaches the zero threshold 402 while the PWM signal level remains at the tri-state value 244 (at 832), the power converter stage transitions to the second BB state 212. The power converter stage remains in the second BB state 212 during time frame 834 while the PWM signal level remains at the tri-state value 244. Thereafter, the power converter stage enters discontinuous conduction mode when the PWM signal level switches to a high value 240 at 836, which triggers a transition to the first DCM state 214, and the inductor current ramps up during time frame 838. When the PWM signal level switches to a low value 242 at 840, the power converter stage transitions to the second DCM state 216 and the inductor current ramps down during the time frames 842. When the PWM signal level switches to the tri-state value 244 at 844, the power converter stage transitions to the third DCM state 218 and the inductor current continues to ramp down during the time frame 846. Then, when the inductor current reaches the zero threshold 402 at 848, the power converter stage transitions to the fourth DCM state 220 and the inductor current remains at zero amps during time frame 850.

Figure 9:
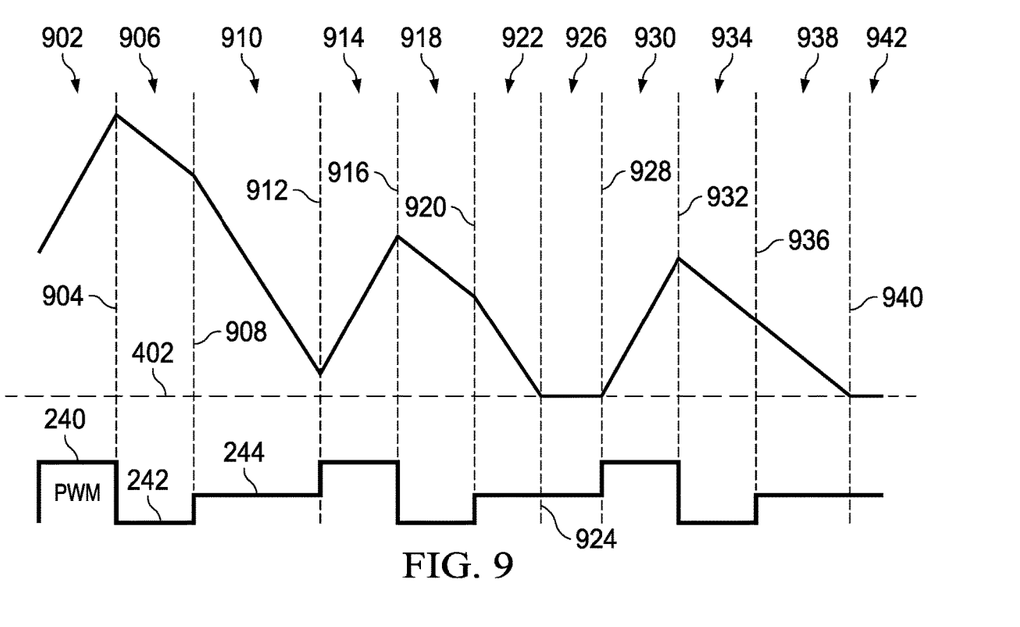

FIG. 9 depicts another situation in which the power converter stage performs body braking in two consecutive cycles. Initially, the power converter stage is in the first CCM state 206 during time frame 902 while the PWM signal level is at the high level 240. In response to the PWM signal level switching to a low level 242 at 904, the power converter stage transitions to the second CCM state 208 and remains in the second CCM state 208 during time frame 906. Body braking is initiated when the PWM signal level changes from a low value 242 to a tri-state value 244 at 908, where the power converter stage transitions to the first BB state 210 and remains in the first BB state 210 during time frame 910. In this example, the inductor current does not reach the zero threshold 402 in the first cycle before the PWM signal level changes to a high value 242 at 912. As a result, the power converter stage transitions from the first BB state 210 to the first CCM state 206, thereby remaining in continuous conduction mode and enabling body braking to be performed again in the next cycle, as depicted. In particular, the power converter stage remains in the first CCM state 206 during the time frame 914. When the PWM signal level switches to a low level 242 at 916, the power converter stage transitions to the second CCM state 208 during time frame 918. When the PWM signal level switches to the tri-state value 244 at 920, the power converter stage transitions to the first BB state 210 and remains in the first BB state 210 during time frame 922. When the inductor current reaches the zero threshold 402 while the PWM signal level remains at the tri-state value 244 (at 924), the power converter stage transitions to the second BB state 212. The power converter stage remains in the second BB state 212 during time frame 926 while the PWM signal level remains at the tri-state value 244. Thereafter, the power converter stage enters discontinuous conduction mode when the PWM signal level switches to a high value 240 at 928, which triggers a transition to the first DCM state 214, and the inductor current ramps up during time frame 930. When the PWM signal level switches to a low value 242 at 932, the power converter stage transitions to the second DCM state 216 and the inductor current ramps down during the time frame 934. When the PWM signal level switches to the tri-state value 244 at 936, the power converter stage transitions to the third DCM state 218 and the inductor current continues to ramp down during the time frame 938. Then, when the inductor current reaches the zero threshold 402 at 940, the power converter stage transitions to the fourth DCM state 220 and the inductor current remains at zero amps during time frame 942.

Figure 10:
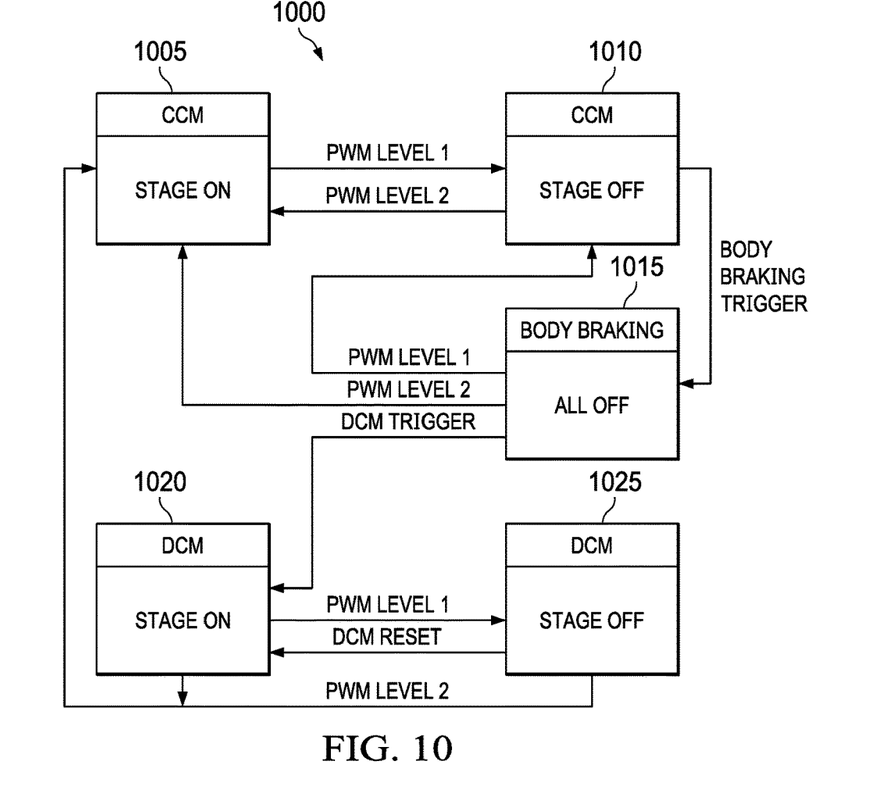
FIG. 10 illustrates an alternative state transition diagram for a single-pin pulse width modulation (PWM) control power converter stage according to one or more aspects of the present disclosure.

FIG. 10 illustrates an alternative state transition diagram 1000 for a single-pin pulse width modulation (PWM) control power converter stage, such as the PWM control DC-DC power converter 100 of FIG. 1, according to one or more aspects of the present disclosure. The power converter stage may switch between a continuous conduction mode (CCM), a body braking mode, and a discontinuous conduction mode (DCM). In addition, the power converter stage may switch between being on (in which case a high-side transistor switch is on, a low-side transistor switch is off, and the output inductor current is ramping up) and being off (in which case the high-side transistor switch is off, the low-side transistor switch is on, and the output inductor current is ramping down). In addition, in the body braking mode, both the high-side transistor switch and the low-side transistor switch are off.

There are five possible states in the state transition diagram 1000, including continuous conduction mode with the stage on state 1005 or stage off state 1010, body braking state 1015, and discontinuous conduction mode with the stage on state 1020 or stage off state 1025. Switching between the states is controlled by a PWM signal level and event sequence tracking. In continuous conduction mode, a first PWM signal level causes a transition from stage on 1005 to stage off 1010, and a second PWM signal level causes a transition from stage off 1010 to stage on 1005. The first PWM signal level may be a high value and the second signal level may be a low value, or vice versa. Alternatively, the first and second PWM signal levels may be different PWM signal patterns (e.g., different number of short pulses).

A body braking trigger may be used to switch from the CCM stage off state 1010 to the body braking state 1015. The body braking trigger may be a third PWM signal level. In some implementations, other body braking triggers may be used (e.g., a pattern of short PWM pulse signals). From the body braking state 1015, the first PWM signal level may cause a transition to the CCM stage off state 1010 and the second PWM signal level may cause a transition to the CCM stage on state 1005. In some implementations, one or both of these transitions may only occur if the output current for the power converter stage has not passed a predetermined threshold level. In some implementations, the PWM signal levels may be different than the signal levels used to switch between the CCM stage on state 1005 and CCM stage off state 1010.

A discontinuous conduction mode (DCM) trigger may cause a transition from the body braking state 1015 to the DCM stage on state 1020. The DCM trigger may be, for example, a crossing of an output current for the power converter stage past a predetermined threshold level followed by a detection of the second PWM signal level. From the DCM stage on state 1020, a transition to the DCM stage off state 1025 may be initiated by detecting the first PWM signal level. In some implementations, the DCM trigger may result in a transition to the DCM stage off state 1025 from the body braking state.

A DCM reset may cause a transition from the DCM stage off state 1025 to the DCM stage on state 1020. For example, the DCM reset may be a crossing of an output current for the power converter stage past a predetermined threshold level followed by a detection of the second PWM signal level. A transition from the DCM stage off state 1025 to the CCM stage on state 1005 may be initiated by the second PWM signal level. In some implementations, other transitions may be possible, such as a transition from DCM stage on state 1020 to the CCM stage on state 1005. In addition, transitions may be in a different sequence. For example, transitions may flow from one or either of the CCM stage on state 1005 or CCM stage off state 1010 to the DCM stage on state 1020 or DCM stage off state 1025, and from one or both of the DCM stage on state 1020 or DCM stage off state 1025 to the body braking state 1015. State transitions for the power converter stage may be initiated using a single control pin or line in combination with event sequence tracking.

Figure 11:
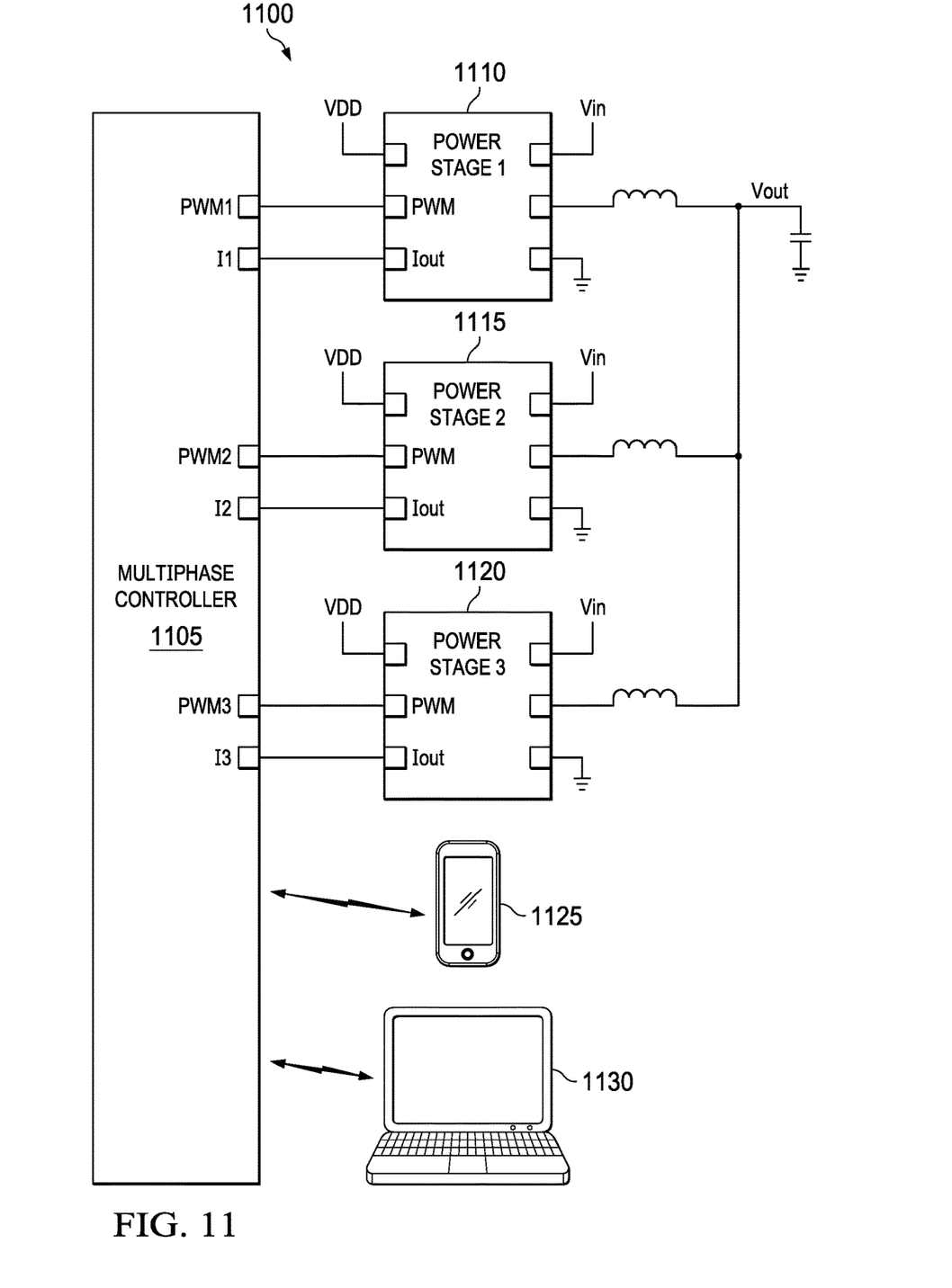
FIG. 11 is a circuit diagram of an embodiment of a multistage single-pin pulse width modulation (PWM) control DC-DC power converter according to one or more aspects of the present disclosure.

FIG. 11 is a simplified circuit diagram of an implementation of a multistage single-pin pulse width modulation (PWM) control DC-DC power converter 1100 according to one or more aspects of the present disclosure. The multistage power converter 1100 includes a multiphase controller 1105 and a plurality of power converter stages 1110, 1115, 1120. The multiphase controller 1105 coordinates operation of the power converter stages 1110, 1115, 1120. The multiphase power converter 1100 (or buck regulator) is a parallel set of buck power stages, each with its own inductor and set of power MOSFETs. Collectively, the components for each stage are called a phase. The phases are connected in parallel and share both input and output capacitors. During steady state operation, individual phases are active at spaced intervals (e.g., equal to 360°/n) throughout the switching period (e.g., where n is the total number of phases).

Each of the power converter stages 1110, 1115, 1120 may be similar to the single power converter stage 100 depicted in and described in reference to FIG. 1. The multiphase controller 1105 coordinates the power conversion performed by the plurality of power converter stages 1110, 1115, 1120. For example, the multiphase controller 1105 may apply control signals to the PWM control pins of each power converter stage 1110, 1115, 1120 to control the operational mode of each respective stage. Each power converter stage 1110, 1115, 1120 may include a single PWM control pin, and the multiphase controller 1105 may include a corresponding control pin for each of the power converter stages 1110, 1115, 1120 to control switching of the transistors in each stage. Thus, each stage may have its own control line. In addition, the multiphase controller 1105 may include a pin for each power converter stage 1110, 1115, 1120 to detect the respective output current of each power converter stage 1110, 1115, 1120. The power converter stages 1110, 1115, 1120 in some implementations, do not include a pin for controlling a discontinuous conduction mode. Rather, PWM control of continuous conduction mode, discontinuous conduction mode, and body braking is performed using the single PWM pin in combination with logic within each power converter stage 1110, 1115, 1120. In some implementations, each power converter stage 1110, 1115, 1120 controls the discontinuous conduction mode autonomously based on the PWM signals and event sequence tracking. The outputs of the power converter stages 1110, 1115, 1120 are connected to a shared output (Vout) for the plurality of power converter stages 1110, 1115, 1120 and/or for the multistage power converter. Each of the power converter stages 1110, 1115, 1120 may be a direct current-to-direct current (DC-DC) power converter stage and may be a buck converter stage.

Figure 12:
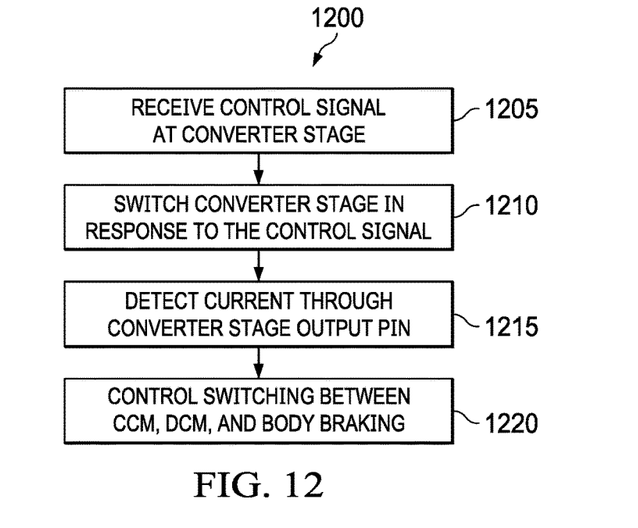
FIG. 12 is a flow diagram of a process for controlling a multistage power converter according to one or more aspects of the present disclosure.

FIG. 12 is a flow diagram of a process 1200 for controlling a multistage power converter according to one or more aspects of the present disclosure. The method includes receiving a control signal on a control pin of a converter stage at 1205. For example, the control signal may be a pulse width modulation signal. In response to the control signal, switching of a converter stage between an on state and an off state is controlled at 1210. In the on state, an output pin of the converter stage is connected to an input voltage pin. In the off state, the output pin of the converter stage is connected to a ground voltage pin. The control signal may include a high value, which places the converter stage in the on state, a low value, which places the converter stage in the off state, and a tri-state value, which provides control of transitions between different operational modes. The tri-state or third value may be between the first and second values or may be a different value. A current through the output pin of the converter stage is detected at 1215. Switching between a continuous conduction mode, a discontinuous conduction mode, and a body braking mode for the converter stage is controlled at 1220 in response to the control signal received on the control pin based on the detected current through the output pin of the converter stage and sequential event tracking. The converter stage may switch to the on state in response to the control signal having the first value, to the off state in response to the control signal having the second value, and from the continuous conduction mode to the body braking mode in response to the control signal having the third value when the current through the output pin passes a threshold current value. The third value may also be used to maintain operation in the discontinuous conduction mode.

In accordance with aspects of this specification, the DC-DC converter may be configured as a voltage mode converter or a current mode converter. The multistage converter may be included in an electronic device, such as a mobile phone 1125 or a computer 1130. For example, multiphase regulators or power converters may help address the increasing complexity of central processing units (CPUs), field-programmable gate arrays (FPGAs), application-specific integrated circuits (ASICs), and peripherals and the resulting higher power delivery demands in such devices (and other computing environments, including motherboards in laptops and tablets to servers and Ethernet switches). The benefits of multiphase regulators may outweigh the complexity for high-performance power applications. For example, compared to single-phase buck regulators, multiphase converters offer reduced input capacitance, reduced output capacitance, improved thermal performance and efficiency at high load currents, and improved overshoot and undershoot during load transients.

While this specification contains many implementation details, these should not be construed as limitations on the scope of the invention or of what may be claimed, but rather as descriptions of features specific to particular implementations of the invention. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may be integrated together in a single software product or packaged into multiple software products.

The features of the present invention which are believed to be novel are set forth below with particularity in the appended claims. However, modifications, variations, and changes to the example implementations of the DC-DC power converter described above will be apparent to those skilled in the art, and the DC-DC power converter described herein thus encompasses such modifications, variations, and changes and are not limited to the specific implementations described herein.

What is claimed is:

1. An apparatus comprising:
   a converter stage comprising:
      a high-side switch coupled between an input voltage terminal and an output terminal;
      a low-side switch coupled between the output terminal and a ground terminal;
      a current sensor configured to detect an output current at the output terminal; and
      control logic coupled to a control terminal and to the current sensor, wherein the control logic is configured to:
         control switching of the high-side switch and of the low-side switch to select continuous conduction mode, discontinuous conduction mode, or body braking mode, in response to a first signal at the control terminal and a second signal at the current sensor;
         transition the high-side switch and the low-side switch from the discontinuous conduction mode to the continuous conduction mode in response to receiving a high value of the first signal at the control terminal;
         transition the high-side switch and the low-side switch from the body braking mode to the discontinuous conduction mode in response to receiving the high value of the first signal; and
         transition the high-side switch and the low-side switch from the body braking mode to the continuous conduction mode in response to receiving a low value of the first signal.

2. The apparatus of claim 1, further comprising an inductor coupled to the output terminal, wherein the output current corresponds to a current through the inductor.

3. The apparatus of claim 1, wherein the control logic is further configured to control switching between the continuous conduction mode, the discontinuous conduction mode, and the body braking mode in response to the high value, the low value, or a tri-state value of the first signal received via the control terminal in combination with the second signal received from the current sensor.

4. The apparatus of claim 3, wherein the control logic is configured to switch from the continuous conduction mode to the body braking mode in response to receiving the tri-state value at the control terminal, and to switch from the body braking mode to the discontinuous conduction mode in response to detecting a crossing of the output current past a threshold level while receiving the tri-state value at the control terminal.

5. The apparatus of claim 1, wherein the converter stage is a first converter stage, and the apparatus further comprises a plurality of DC-DC converter stages including the first converter stage.

6. The apparatus of claim 5, wherein each of the plurality of DC-DC converter stages includes a corresponding control terminal to independently control switching between the continuous conduction mode, the discontinuous conduction mode, and the body braking mode for the respective DC-DC converter stage, the apparatus further comprising a controller configured to provide the first signal to control terminals of the respective DC-DC converter stages.

7. The apparatus of claim 1, wherein the control logic includes a state machine.

8. The apparatus of claim 1, wherein the control logic is configured to, after the second signal indicates a zero crossing while the high-side switch and the low-side switch are in the discontinuous conduction mode:
   in response to receiving the high value of the first signal, transition the high-side switch and the low-side switch to the continuous conduction mode; and
   in response to receiving the low value of the first signal, instruct the high-side switch and the low-side switch to remain in the discontinuous conduction mode.

9. The apparatus of claim 1, wherein the control logic is configured to transition the high-side switch and the low-side switch from the body braking mode to the discontinuous conduction mode in response to a DCM trigger.

10. A method comprising:
    receiving a control signal at a control terminal of a converter stage;
    controlling switching of a converter stage between an on state and an off state, wherein an output terminal of the converter stage is coupled to an input voltage terminal in the on state, and to a ground terminal in the off state;
    detecting an output current through the output terminal of the converter stage; and
    controlling switching between a continuous conduction mode, a discontinuous conduction mode, and a body braking mode in response to the control signal received at the control terminal based on the detected output current and sequential event tracking, comprising transitioning from the discontinuous conduction mode to the continuous conduction mode in response to receiving a high value of a pulse-width modulation signal at the control terminal, transitioning from the body braking mode to the discontinuous conduction mode in response to receiving the high value of the pulse-width modulation signal, and transitioning from the body braking mode to the continuous conduction mode in response to receiving a low value of the pulse-width modulation signal.

11. The method of claim 10, wherein the control signal is a pulse width modulation signal having the high value, a low value, or a tri-state value, the method further comprising switching the converter stage to the on state in response to the control signal having the high value, to the off state in response to the control signal having the low value, and from the continuous conduction mode to the body braking mode in response to the control signal having the tri-state value.

12. The method of claim 10, wherein the control signal is a pulse width modulation signal having the high value, a low value, or a tri-state value, the method further comprising switching the converter stage to the on state in response to the control signal having the high value, to the off state in response to the control signal having the low value, and from the body braking mode to the discontinuous conduction mode in response to the output current passing a threshold current value while the control signal has the tri-state value.

13. The method of claim 10, further comprising receiving control signals from a controller at respective converter stages to control switching between the continuous conduction mode, the discontinuous conduction mode, and the body braking mode for each respective converter stage in response to the received control signal based on the detected output current at a respective output terminal of the converter stage and sequential event tracking for the converter stage.

14. An electronic device comprising:
a multi-stage converter comprising converter stages, a converter stage of the converter stages comprising:
a high-side switch coupled to an input voltage pin, the high-side switch configured to ramp up an output current through an output terminal of the converter stage;
a low-side switch coupled to a ground terminal, the low-side switch configured to ramp down the output current through the output terminal of the converter stage;
a current sensor configured to detect the output current through the output terminal of the converter stage; and
control logic coupled to a control terminal and to the current sensor, wherein the control logic is configured to:

control switching of the high-side switch and of the low-side switch in a continuous conduction mode, a discontinuous conduction mode, and a body braking mode for the converter stage in response to a first signal received via the control terminal and a second signal received from the current sensor;
transition the high-side switch and the low-side switch from the discontinuous conduction mode to the continuous conduction mode in response to receiving a high value of the first signal;
transition the high-side switch and the low-side switch from the body braking mode to the discontinuous conduction mode in response to receiving the high value of the first signal; and
transition the high-side switch and the low-side switch from the body braking mode to the continuous conduction mode in response to receiving a low value of the first signal.

15. The electronic device of claim 14, further comprising a controller coupled to control terminals of the respective converter stages, the controller configured to apply respective first signals via respective control pins, wherein the converter stages are configured to independently control switching between the continuous conduction mode, the discontinuous conduction mode, and the body braking mode for the respective converter stage in response to the respective first signals and the respective second signals.

16. The electronic device of claim 14, wherein the first signal has the high value, the low value, and a tri-state value between the high value and the low value.

17. The electronic device of claim 16, wherein the control logic is configured to control switching between the continuous conduction mode, the discontinuous conduction mode, and the body braking mode for a converter stage of the converter stages in response to a sequence of control signals received via the control pin and a signal received from the current sensor indicating the output current crossing a threshold current level.

18. The electronic device of claim 17, wherein the control logic is configured to switch from the continuous conduction mode to the body braking mode in response to the first signal having the tri-state value.

19. The electronic device of claim 17, wherein the control logic is configured to switch from the body braking mode to the discontinuous conduction mode in response to the output current crossing the threshold current level while the first signal has the tri-state value.

* * * * *